(12) United States Patent
Brumme et al.

(10) Patent No.: US 7,437,711 B2
(45) Date of Patent: Oct. 14, 2008

(54) COMMUNICATION AMONG AGILE AND CONTEXT-BOUND OBJECTS

(75) Inventors: Christopher W. Brumme, Mercer Island, WA (US); James M. Lyon, Redmond, WA (US); Michael J. Toutonghi, Seattle, WA (US); Satish R. Thatte, Redmond, WA (US); Gopal Krishna R. Kakivaya, Redmond, WA (US); Richard D. Hill, Kirkland, WA (US); Jan S. Gray, Bellevue, WA (US); Craig H. Wittenberg, Mercer Island, WA (US); Rebecca A. Norlander, Seattle, WA (US); Scott G. Robinson, Duvall, WA (US); Eric W. Johnson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 10/633,911

(22) Filed: Aug. 4, 2003

(65) Prior Publication Data

US 2004/0068732 A1    Apr. 8, 2004

Related U.S. Application Data

(63) Continuation of application No. 09/447,162, filed on Nov. 22, 1999, now abandoned.

(51) Int. Cl.
*G06F 9/45* (2006.01)
(52) U.S. Cl. .................................................... 717/120
(58) Field of Classification Search ................... 717/120
See application file for complete search history.

(56) References Cited

U.S. PATENT DOCUMENTS

| 5,473,777 | A | * | 12/1995 | Moeller et al. | 719/328 |
|---|---|---|---|---|---|
| 5,732,270 | A | * | 3/1998 | Foody et al. | 719/316 |
| 5,737,605 | A | | 4/1998 | Cunningham et al. | |
| 6,049,838 | A | | 4/2000 | Miller et al. | |
| 6,269,373 | B1 | | 7/2001 | Apte et al. | |
| 6,349,343 | B1 | * | 2/2002 | Foody et al. | 719/316 |
| 6,356,930 | B2 | | 3/2002 | Garg | |
| 6,442,620 | B1 | | 8/2002 | Thatte et al. | |
| 6,505,210 | B1 | | 1/2003 | Frey et al. | |
| 6,941,561 | B1 | * | 9/2005 | Kasichainula et al. | 719/330 |

OTHER PUBLICATIONS

Hagimont, et al., Problemes de designation, de localisation et d'acces dans les systemes repartis a objets, Technique Et Science Informatiques, L'Afcet, Paris, France, vol. 15, No. 1, 1996, pp. 9-36, English Abstract.

(Continued)

*Primary Examiner*—John Chavis
(74) *Attorney, Agent, or Firm*—Workman Nydegger (57) ABSTRACT

Communication among agile objects and context-bound objects within object-oriented programming environments, including communication across contextual boundaries, is disclosed. In one embodiment, a reference to a second object within a second context is wrapped in a proxy wrapper. A first object within a first context calls the second object via the wrapped reference. No direct reference is held by the first object to the second object. Other embodiments relate to agile objects. Agile objects called by context-bound objects execute in the contexts of their callers. The context of a calling context-bound object becomes the context of an agile object for calling of the agile object by the calling context-bound object. Direct reference to the agile object by the context-bound object is thus permitted.

17 Claims, 6 Drawing Sheets

OTHER PUBLICATIONS

Mariana, et al., Cooperative Information Sharing: Developing a Shared Object Service, Computer Journal, Great Britain, Oxford University Press, Surrey, vol. 39, No. 6, 1996, pp. 455-470.

Montgomery, Sunsoft's Object Lesson, Byte Magazine, vol. 21, No. 2, Feb. 1, 1996, pp. 117-120, 122.

* cited by examiner

COMMUNICATION AMONG AGILE AND CONTEXT-BOUND OBJECTS

This application is a continuation of U.S. application Ser. No. 09/447,162, filed on Nov. 22, 1999, now abandoned the entire disclosure of which is hereby incorporated by reference.

FIELD OF THE INVENTION

This invention relates generally to object-oriented programming environments, and more particularly to agile and context-bound objects within such environments.

BACKGROUND OF THE INVENTION

Object-oriented programming environments have become increasingly popular for the development of computer software. In an object-oriented programming environment, a program is divided into a number of software objects. Each object is a component, with its own code and data. One object cannot access another object except through the other object's variables and methods. That is, an object's internal variables and internal methods are not able to be accessed by other objects. A method of an object is a function providing the object with some functionality that can be accessed by a caller. Exposed methods are those that can be called by other objects; internal methods cannot. A variable of an object is the object's data, such that exposed variables are the data of an object that can be accessed by other objects, and internal (or, local) variables cannot be accessed by other objects.

In some object-oriented programming environments, such as the Component Object Model (COM), an object can have a context, such that there may be a number of contexts for a given computer program, with a number of objects within each context. A context generally specifies one or more common conditions for the objects within the context, one or more common aspects of the objects within the context, or one or more other commonalities of the objects within the context. Thus, by knowing a given object's context, facts regarding the object are known a priori, or a run-time. More formally, the context of an arbitrary set of objects specifies arbitrary invariants, including side effects when such objects are called from outside the context, on the arbitrary set of objects. These objects may be within the same or different process space. That is, where a computer program is defined as a process, it may have one or more threads of execution, where a thread of execution as used herein means the finest unit of execution that can be executed by a processor of a computer running the computer program. Thus, a process space refers to a given process, and the threads within that process.

Typically, objects within a given context usually only communicate with other objects within that context. However, some objects are what is referred to as agile. That is, they have no a priori context, and instead take on the context of their calling object. An agile object executes in the context of its calling object; the context of the calling object becomes the context of the agile object. However, there is not a common framework for describing the use and analysis of agile objects within the prior art. Furthermore, while uncommon, sometimes context-bound objects need to communicate with objects in other contexts. The prior art also generally does not provide for an efficient mechanism for such cross-context communication. For these and other reasons, there is a need for the present invention.

SUMMARY OF THE INVENTION

The invention provides for efficient communication among agile objects and context-bound objects within object-oriented programming environments, including communication between context-bound objects in different contexts, across contextual boundaries. For instance, in one embodiment, a reference to a second object within a second context is wrapped in a proxy wrapper. The second context defines at least a second set of arbitrary invariants on a second set of arbitrary objects including the second object. A first object within a first context calls the second object within the second context via the reference as wrapped in the proxy wrapper. The first context defines at least a first set of arbitrary invariants on a first set of arbitrary objects including the first object. The second object returns the call to the first object via the reference as wrapped in the proxy wrapper. No direct reference is held by the first object to the second object.

The invention thus provides for advantages not found in the prior art. The proxy wrapping of a reference to an object in a given context permits another object in a different context to reference the object, but not in a direct manner. While there may be a performance penalty for communication through this effective proxy layer, it is noted that cross-contextual communication among objects is relatively rare. Therefore, the invention provides for an object architecture in which most communication does not occur via proxy layers, but the existence of proxy wrappers allows for cross-contextual communication to occur when needed.

Other embodiments of the invention relate to agile objects. Agile objects called by context-bound objects execute in the contexts of their callers. The context of a calling context-bound object thus becomes the context for an agile object for the current thread of execution. Thus, direct reference to the agile object by the calling context-bound object is permitted. In this sense, agile objects do not have a permanent context, or, put another way, agile objects simultaneously exist in all contexts from a conceptual perspective.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
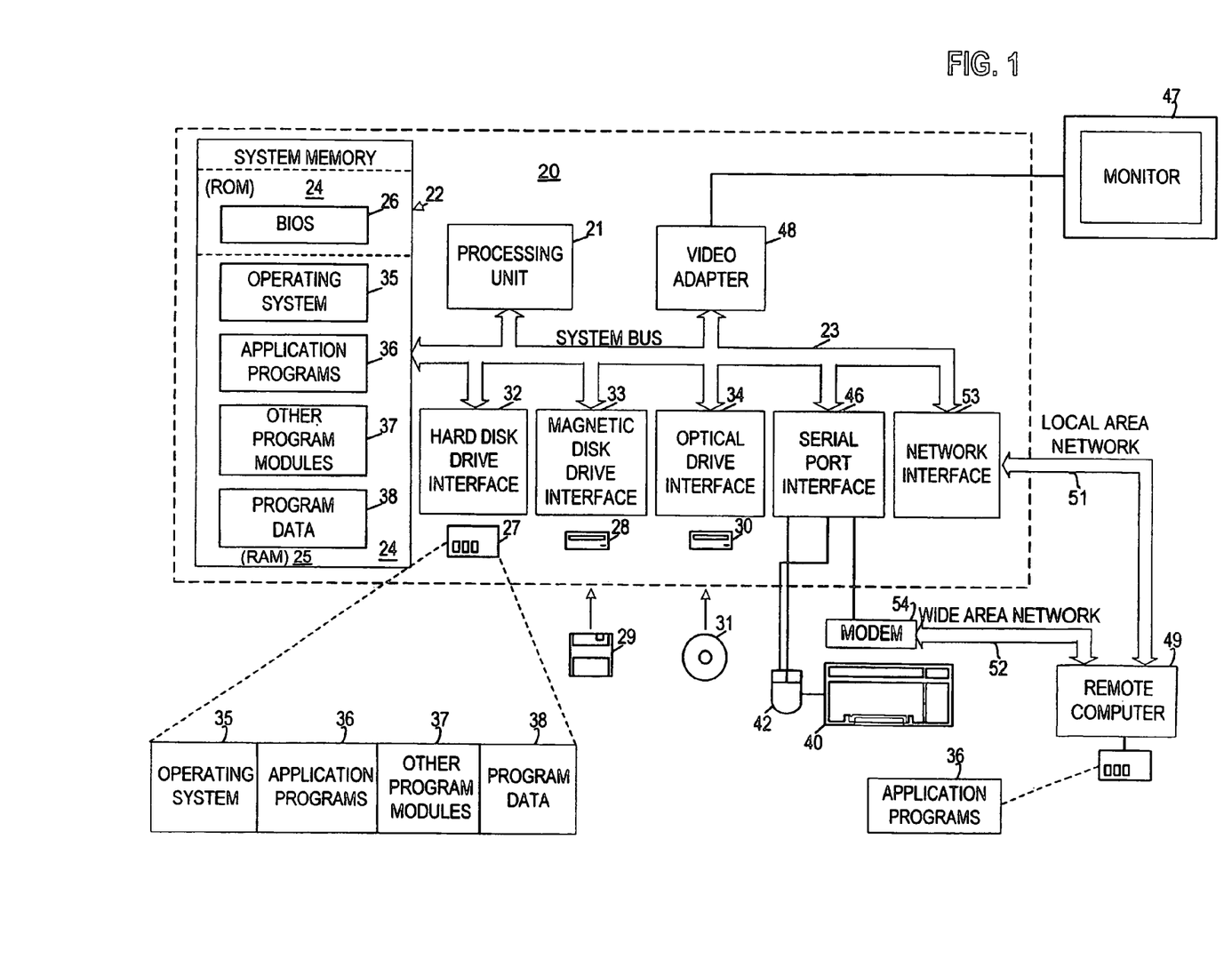
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Object-Oriented Contextual Programming Environment

In this section of the detailed description, an object-oriented programming environment providing for contexts, according to varying embodiments of the invention, is presented. The presentation is made in conjunction with FIG. 2, which is a diagram of a representative such environment. The environment of FIG. 2 includes a first context 200, a second context 202, and objects 204, 206, 208, 210 and 212. Objects 204, 206 and 208 exist within the first context 200, while objects 210 and 212 exist within the second context 202. The contexts 200 and 202 are examples of contexts. A context generally specifies one or more common conditions for. the objects within the context, one or more common aspects of the objects within the context, or one or more other commonalities of the objects within the context. More formally, the context of an arbitrary set of objects specifies arbitrary invariants, including side effects when such objects are called from outside the context, on the arbitrary set of objects. The object 214 is an agile object. An agile object has no priori context, and instead takes on the context of their calling object. An agile object executes in the context of its calling object; the context of the calling object becomes the context of the agile object for the current thread of execution.

Figure 2:
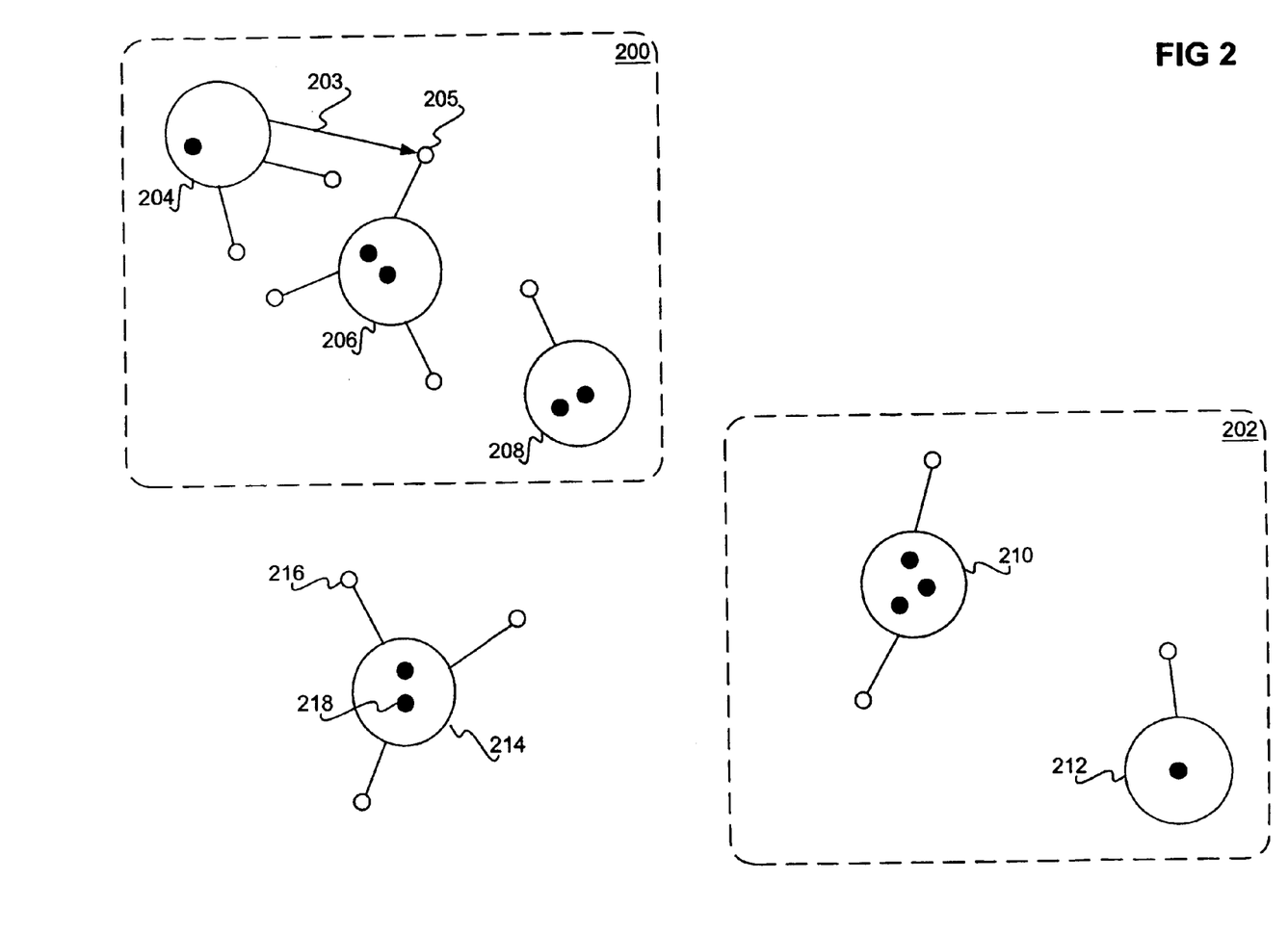
FIG. 2 is a diagram of a representative object-oriented programming environment providing for contexts, according to an embodiment of the invention.

Each object can have data and methods. More specifically, each object can have internal data and internal methods, as well as external data and external methods. As shown in FIG. 2, an object's internal data and methods are represented as a filled-in circle within an object. For example, the object 214 has internal data and methods as represented by the filled-in circle 218. An object's external data and methods are represented as a hollow circle within an object in FIG. 2. Thus, the object 214 has external data and methods such as that represented by the hollow circle 216. An object can have one or more of either internal data or methods, or external data or methods. Thus, as shown in FIG. 2, each object has a number of filled-in and hollow-circles, to signify these potentially differing amounts. An object can only access the external data and methods of another object, and never that object's internal data or methods. This is why filled-in circles in FIG. 2, representing internal data and methods, are shown within the objects, and hollow circles, representing external data and methods, are shown extending outside the objects.

When a caller object calls a callee object, the following occurs, as can be appreciated by those of ordinary skill within the art. When the caller object calls a particular method of a callee object the current thread of execution passes from the caller object to the callee object. It is noted that a single object may have multiple threads of execution executing therein at any given time. Furthermore, it is noted that calling of a method of one object by another object is also one instance of inter-object communication. Other inter-object communication includes the accessing of external data of one object by another object. As used herein, inter-object communication is sometimes referred to in shorthand as communication, where by the context of the sentence in which the term is used it can be understood that the communication referred to is in fact inter-object communication.

For context-bound objects, such as the objects 204, 206 and 208 within the first context 200, and the objects 210 and 212 within the second object 202, direct communication (that is, direct inter-object communication) can only occur with other objects also bound in that context, or when a context bound object calls an agile object. Direct communication refers to communication not involving proxy layers or proxy wrappers. More specifically and precisely, objects within a given context can hold direct references only to other objects also within that context, or to an agile object. A reference as used herein is defined as a pointer from one object to another object; a pointer is a type of data structure, as known within the art, used for one object to point to another object. More generally, a pointer to an object is any link, the value of which is the identifier of the object, or any attribute of one object that contains an explicit reference to another object. An example of a direct reference as shown in FIG. 2 is represented as the arrow 203 between object 204 and the hollow circle 205 (representing an external method or data) of the object 206.

Thus, the object 204 can only directly access objects 206 and 208 directly—as well as the object 214, as described in the next paragraph. Likewise, the object 210 can only directly access object 212—as well as the object 214, as described in the next paragraph. The objects 204, 206 and 208 cannot directly access the objects 210 and 212, and vice-versa—that is, the objects 204, 206 and 208 cannot hold direct references to the objects 210 and 212, and vice versa—since the former objects are contextually bounded from the latter objects.

However, any object in any context can access the agile object 214 in a direct manner, that is, by holding a direct reference to the agile object 214. To a caller object within the context 200, the agile object 214 executes within the context 200—that is, current execution thread for the agile object 214 is executes within the context 200—such that to the caller object within the context 200 the agile object 214 appears as if it were context-bound in the context 200 for communication therewith. Likewise, to a caller object within the context 202, the agile object 214 executes within the context 202, such that to the caller object within the context 202 the agile object 214 appears as if it were context-bound in the context 202.

The agile object 214 can directly access any other object in the context in which it is executing. Thus, if the object 204 calls the agile object 214, then the latter can also directly call the objects 206 and 208, which are in the same context as the object 204. As another example, if the object 210 calls the agile object 214, then the agile object 214 can also directly call the object 212. However, if the object 204 calls the agile object 214, then the agile object 214 cannot directly call the object 212, since the latter object is in a different context than the object 204.

Object Communication Across Contextual Boundaries

In the previous section of the detailed description, an object-oriented contextual environment was described in conjunction with which embodiments of the invention may be practiced. The environment described provided for intra-context communication of contextual-bound objects, including agile objects. However, the environment described did not provide for inter-context communication of contextual-bound objects. Such cross-contextual object communication is now presented, in accordance with differing embodiments of the invention.

Figure 3:
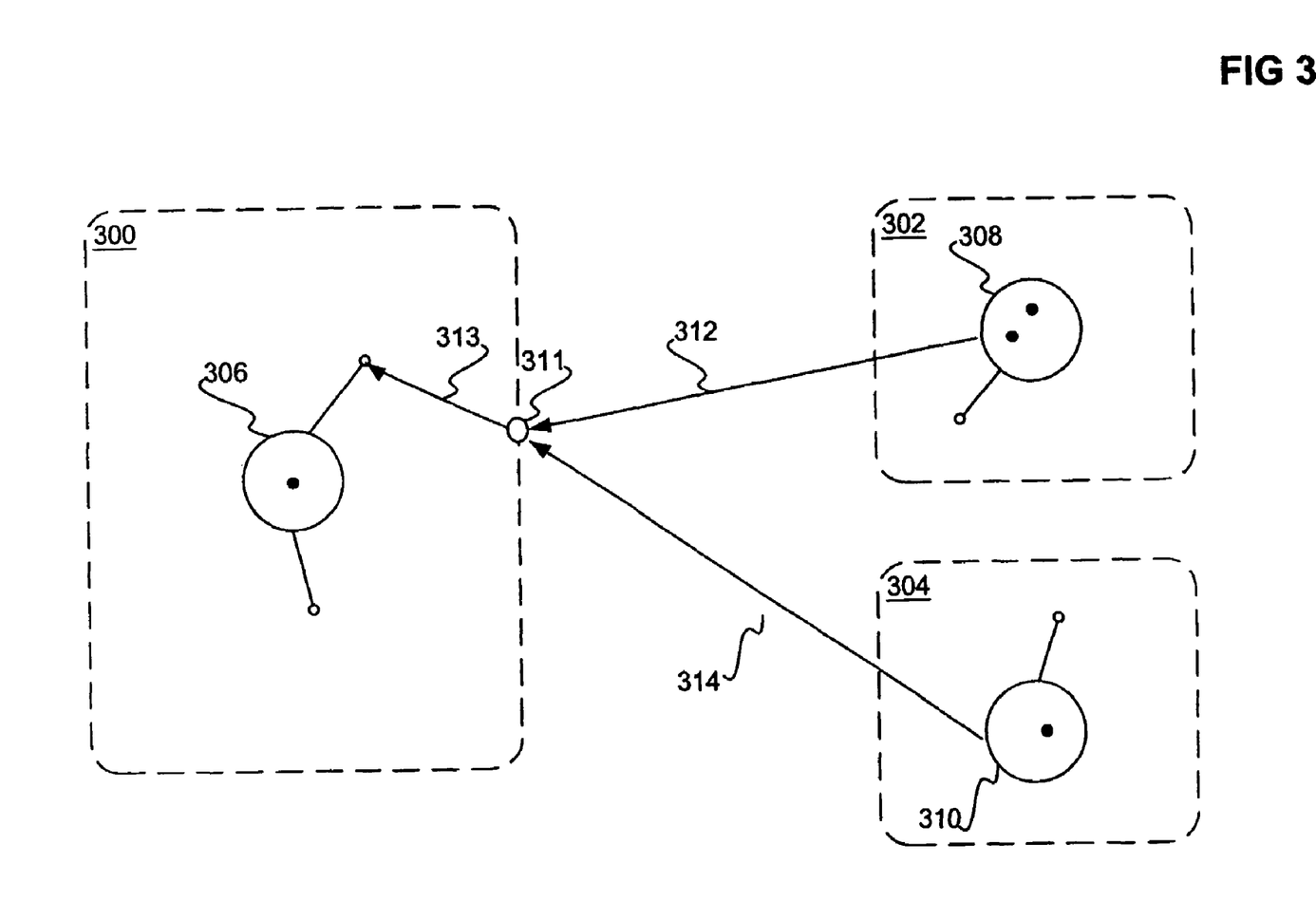
FIG. 3 is a diagram of an object-oriented environment in which a reference to an object is wrapped in a proxy wrapper to allow for cross-contextual object communication, according to an embodiment of the invention.

Referring to FIG. 3, an object-oriented environment is shown where a reference to an object is wrapped in a proxy wrapper to allow for cross-contextual object communication, according to an embodiment of the invention. There are three contexts, a first context 300, a second context 302, an a third context 304. Each context has an object existing therein, a first object 306 within the first context 300, a second object 308 within the second context 302, and a third object 310 within the third context 304. Consistent with the preceding section of the detailed description, none of the objects can normally communicate with one another, since they exist in different contexts and are not agile objects.

However, such cross-contextual object communication may be desirable at times. For example, the object 308 may wish to call an exposed method of the object 306. As another example, the object 310 may wish to access exposed data of the object 306. This is provided for by wrapping references to the object 306 in proxy wrappers.

Thus, the objects 308 and 310 do not hold direct references to object 306; rather, they hold direct references to proxies, which hold direct references to the methods of the object 306. As used herein, wrapping a reference to an object with a proxy wrapper means using an intermediary proxy to reference the object. Thus, conceptually the reference to an object is wrapped with a proxy wrapper; in actuality, in one embodiment, a first reference points to a proxy, which then has a second reference directly pointing to the desired method or data of an object. The invention is not so limited, however.

For example, in the case of the object 308, before the object 308 can call an exposed method of the object 306, or access exposed data of this object, a reference to the object 306 is first wrapped with a proxy wrapper. Thus, the object 308 holds a direct reference 312 to the proxy 311, which itself holds a direct reference 313 to the desired exposed method or data of the object 306. Conceptually, the object 308 holds a reference to the object 306 that is wrapped by a proxy wrapper. The proxy 311 can also be referred to as a proxy layer.

As another example, in the case of the object 310, before the object 310 can call an exposed method of the object 306, or access exposed data of this object, a reference to the object 306is first wrapped with a proxy wrapper. Thus, the object 310 holds a direct reference 314 to the proxy 311, which itself holds a direct reference 313 to the desired exposed method or data of the object 306. Conceptually, the object 310 holds a reference to the object 306 that is wrapped by a proxy wrapper. In the embodiment shown in FIG. 3, in actuality the object 308 holds a reference 314 to the proxy 311, which itself holds a direct reference 313 to an exposed method or data of the object 306. The proxy 311 can also be referred to as a proxy layer.

The wrapping of references in proxy wrappers allows for communication between the object 306 and objects outside of the context 300 of the object 306—such as the object 308 in the context 302 and the object 310 in the context 304. The wrapping allows such inter-context communication to occur in an indirect manner. As those of ordinary skill within the art can appreciate, the proxy layer fields a request for method and/or data access by a requesting object, transmits this request to the requested object as if it were an object within the requested object's context, and then returns the responded-with information back to the requesting object. A proxy layer thus allows for cross-contextual object communication, while still maintaining the invariant that an object cannot communicate with objects outside of its context. Strictly speaking, the object is not communicating with objects outside of its context; rather, the proxy is performing the communication.

It is noted that the environments described in this and the preceding section of the detailed description can be implemented as computerized systems according to differing embodiments of the invention. Within such systems, for example, the objects may be stored on computer-readable media such as memory or hard disk drives, for execution by a processor. The media and the processor may be part of a computer, such as that which has been described in conjunction with FIG. 1 in the first section of the detailed description. The invention, however, is not so limited.

Particular Implementation

In this section of the detailed description, a particular implementation of providing for proxy wrappers of context-bounded objects, according to an embodiment of the invention, is presented. The presentation is made in conjunction with FIGS. 4(a) and 4(b). The invention, however, is not limited to the implementation described herein.

Figure 4A:
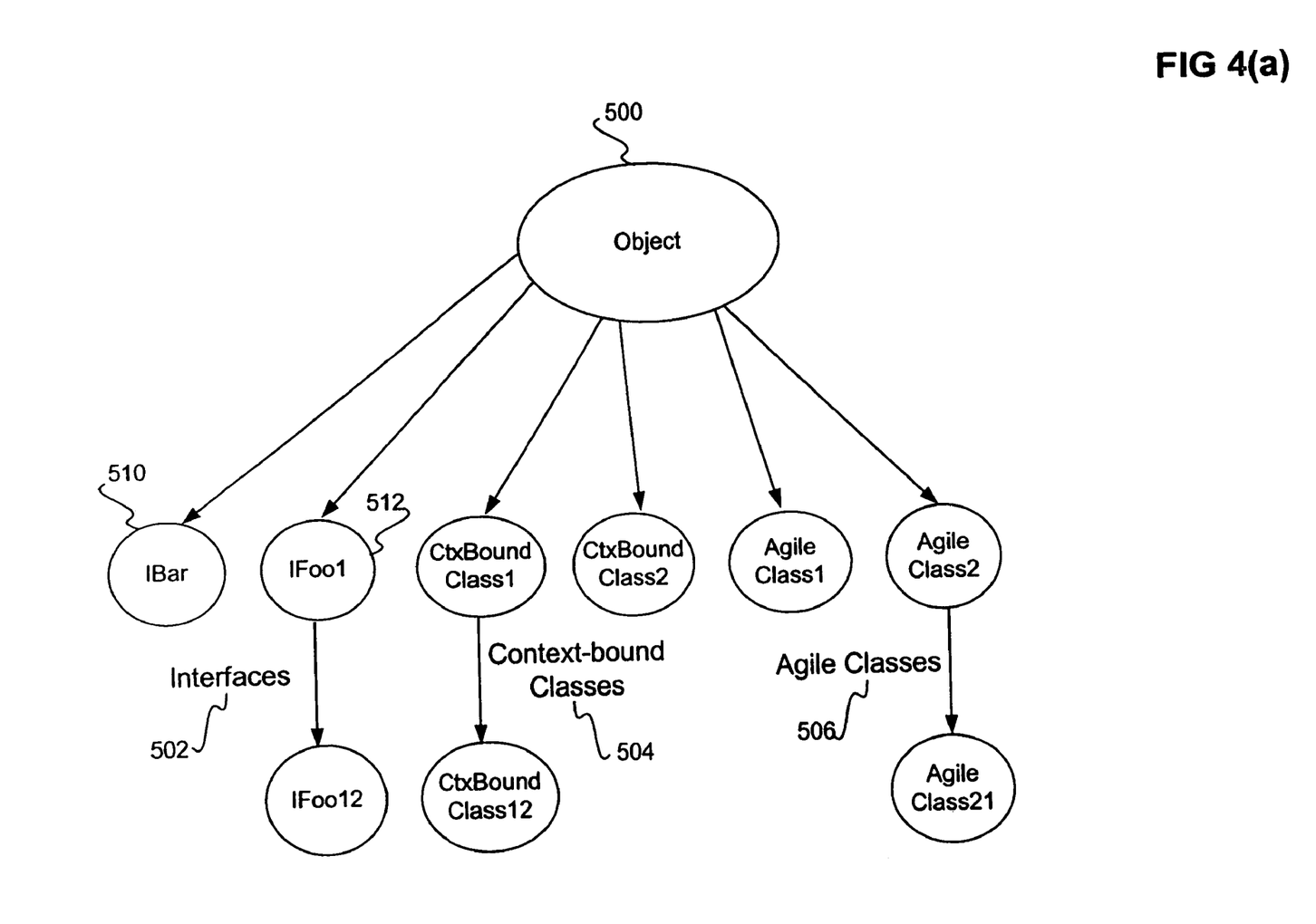
FIG. 4(a) is a diagram of a logical object class hierarchy, according to a particular implementation of an embodiment of the invention.

Referring first to FIG. 4(a), a diagram of a logical class hierarchy of objects for a particular implementation of an embodiment of the invention is shown. An object class 500 has subclasses interfaces 502, context-bound classes 504, and agile classes 506. Each of these subclasses is shown to have two different types of subclasses, such as ibar 510 and ifool 512 within interfaces 502. As can be appreciated by those of ordinary skill within the art, this is for example purposes only, and the invention is not so limited. Furthermore, several of the subclasses have subclasses themselves, as can be seen in FIG. 4(a).

A class or subclass of objects can be defined generally in one embodiment as a particular definition of an object. A class or subclass does not, however, refer specifically to a particular object, but rather to a particular type of object. When an object of a given class or subclass is desired, the object is said to be instantiated from the given class or subclass. The specific instantiation is a particular object of the given class or subclass.

The context-bound classes 504 include particular types of context-bound objects consistent with the description already provided of context-bound objects in the application. Likewise, the agile classes 506 include particular types of agile objects consistent with the description already provided of agile objects in the application. The interfaces 502 can either be agile or context-bound, depending on the embodiment of the invention, and generally refer to specifications of the boundaries of objects in terms of the possible interactions or properties that are visible across those boundaries. An interface determines the external view of an object, what it is, and how it will act and react. The interface of an object documents what the object does, not how it does it.

The logical class hierarchy of objects of FIG. 4(a) is shown to illustrate that from a logical perspective, all object classes are subclasses of a main object class 500. This is consistent with object-oriented programming principles, where all objects are objects, but may also be a particular type of object. However, the implementation of the logical class hierarchy of objects of FIG. 4(a) differs somewhat from this logical perspective of object classes.

Figure 4B:
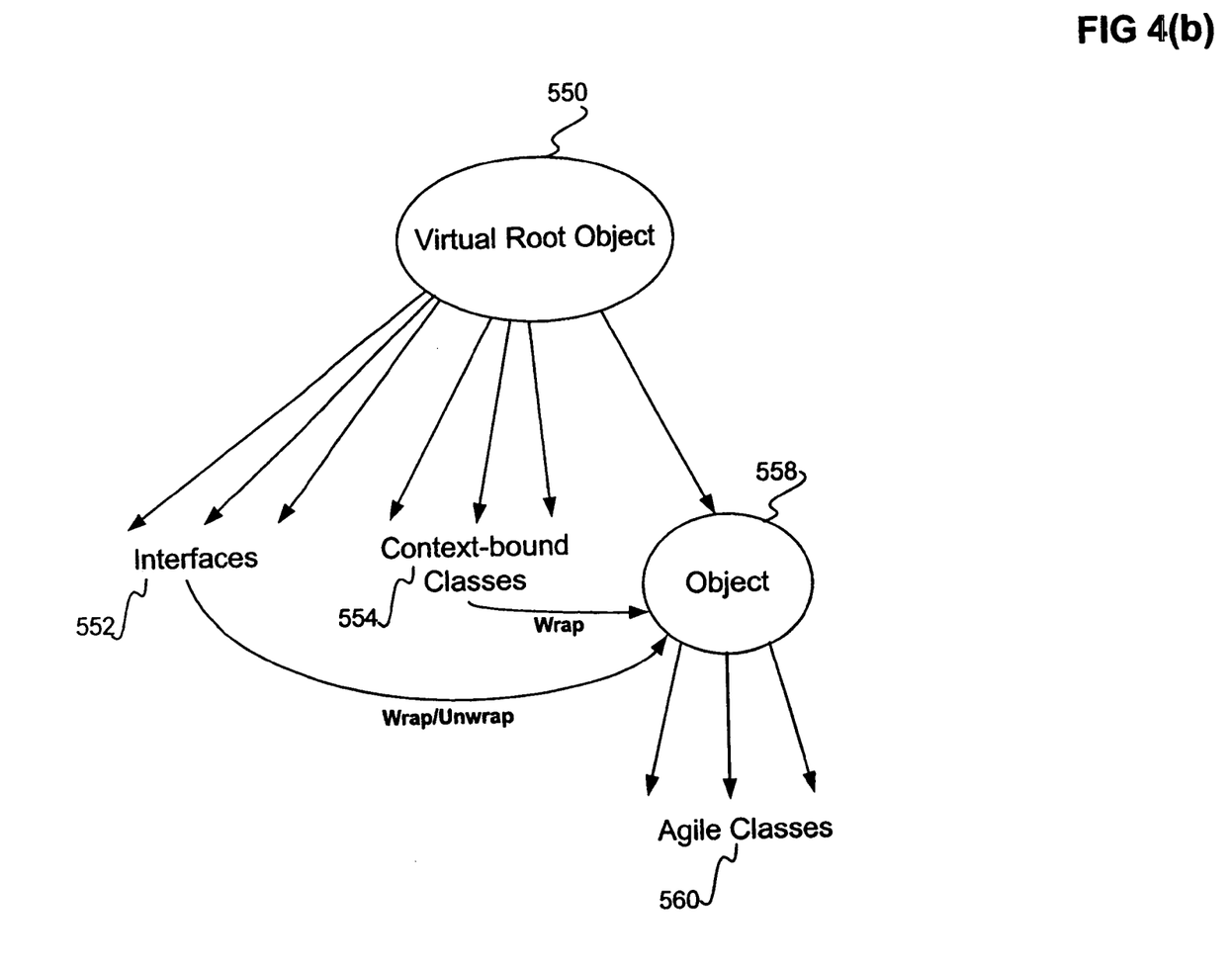
FIG. 4(b) is a diagram of an implementation hierarchy for the logical class hierarchy of FIG. 4(a), according to a particular implementation of an embodiment of the invention; and, FIG. 5 is a flowchart of a method according to an embodiment of the invention.

Referring next to FIG. 4(b), a diagram of an implementation hierarchy for the logical class hierarchy of objects of FIG. 4a) for a particular implementation of an embodiment of the invention is shown. The description in the remainder of this section of the detailed description focuses on the implementation of communication among agile and context-bound objects. That is, the implementation of how communication among agile and context-bound objects, as described in conjunction with FIG. 4(a) in this section and also in preceding sections of the detailed description, is described. To programmers who are developing computer programs using agile objects, context-bound objects, and communication thereamong as has been described, the implementation herein is a hidden detail. However, to programmers who are developing the underlying architecture to support such agile objects, context-bound objects, and communication thereamong as has been described, the implementation described herein is one manner by which such agile objects, context-bound objects, and communication thereamong can be facilitated.

The implementation hierarchy of FIG. 4(b) includes a virtual root object class 550, which is ambiguous as to agility and contextfulness. The class 550 is referred to as the virtual root object class. Interfaces 552 and context-bound classes 554 are as they were in the logical class hierarchy of FIG. 4(a): they are sub-classes of a main class of objects, is this case, the virtual root object class 550. However, agile classes 560 have been demoted as subclasses of an object class 558 which is a subclass of the virtual root object class 550. In other words, the object class 558 is the root of agile classes. This is because, in general, most objects are likely to be agile, as has been described. This demotion is also done to allow to more easily facilitate wrapping of references to objects within context-bound object classes, such as the context-bound classes 554, and in the specific case of FIG. 4(b) where the interfaces 552 are also context-bound, the interfaces 552.

The wrap operation shown in FIG. 4(b) changes an object from a particular context-bound class to an agile class of the object class 558, via the wrapping of a reference to the object within a proxy wrapper. Thus, the agile classes 560 are shown as demoted to the object class 558 in FIG. 4(b), so that objects of context-bound classes can be cast as objects of the object class 558, and thus appear as agile objects. Casting an object generally refers to logically wrapping a reference to an object in a proxy wrapper.

A wrap operation applied to a reference of a context-bound object creates an agile proxy. When applied to a reference to an agile object, the wrap operation returns the object itself. That is, references to agile objects cannot be wrapped. An unwrap operation applied to a proxy returns the context-bound object the proxy references when called inside the context of the object, else it returns the proxy itself. That is, an unwrap request only performs an unwrap operation when requested by objects within the same context as the desired proxy wrapper-wrapped object. If an object within a first context desires to unwrap a proxy wrapper-wrapped reference to an object within a second context, the unwrap operation does succeed, but just returns the proxy.

The decision to treat the object class 558 as agile, and interfaces 552 as context-bound, as shown in FIG. 4(b), desirably optimizes for the environment in which most classes are agile, interface invoke operations are relatively common, and very few agile locations store interface pointers, as can be appreciated by those of ordinary skill within the art. Interface invoke operations are generally defined as calling a method declared by an interface and implemented by an object. Agile locations refer to memory locations that are classified as agile, in that they can simultaneously exist in all contexts. Interface pointers are generally defined as pointers that reference interfaces, and thus are context-bound in the case of FIG. 4(b), since the interfaces 552 themselves have been set as context-bound.

Besides pointers and references, other memory locations can also be classified as either context-bound or agile, to preserve the integrity of context boundaries among objects. Memory locations statically known to be context-bound include member variables of context-bound classes. Local variables are the internal to an invocation of a method, and can be said to reside on a data structure known as a stack in one embodiment of the invention, as can be appreciated by those of ordinary skill within the art. Parameters to methods are the values submitted by a calling object to a method of a called object for the called object to use when performing the functionality provided by the method, and likewise can be said to reside on a stack in one embodiment of the invention. Local variables and parameters are correct for the current context of the executing thread.

Furthermore, memory locations statically known to be agile include member variables of agile classes and static variables of all classes. A static variable of all classes is generally viewed as a global variable, which exists apart from any given object, and is also accessible by all objects. Local variables and parameters can be considered to be agile or non-agile locations, with different performance results for these choices. It is also possible to recognize that local variables and parameters are correctly wrapped or unwrapped for the current context that the thread of execution is currently executing in.

For a successful implementation of agility and contextfulness within an object-oriented programming environment providing cross-contextual communication, it is desirable to preserve the integrity of contextual boundaries. In one embodiment, this is accomplished by ensuring that the following rules are not violated; however, as can be appreciated by those of ordinary skill within the art, other embodiments may have other rules, in addition to or in lieu of at least one of the rules listed here.

1. When a context-bound object is assigned to an agile memory location, a reference thereto is wrapped;
2. When a context-bound object is cast to an agile class, which can only by the object class 558 of FIG. 4(b) in one embodiment, a reference thereto is wrapped;
3. When an interface is assigned to an agile location, a reference thereto is wrapped;
4. When an interface is cast to the object class 558, a reference thereto is wrapped;
5. When an agile location statically known to contain a reference to a context-bound class is used, the reference is unwrapped;
6. When an agile object is cast to a context-bound class, which can only be from the object class 558, in one embodiment, a reference thereto is unwrapped;
7. When an interface pointer is retrieved from an agile location, it is unwrapped; and,
8. When an agile object is cast to an interface, which can only be from the object is class 558, in one embodiment, a reference thereto is unwrapped.

Methods

Figure 5:
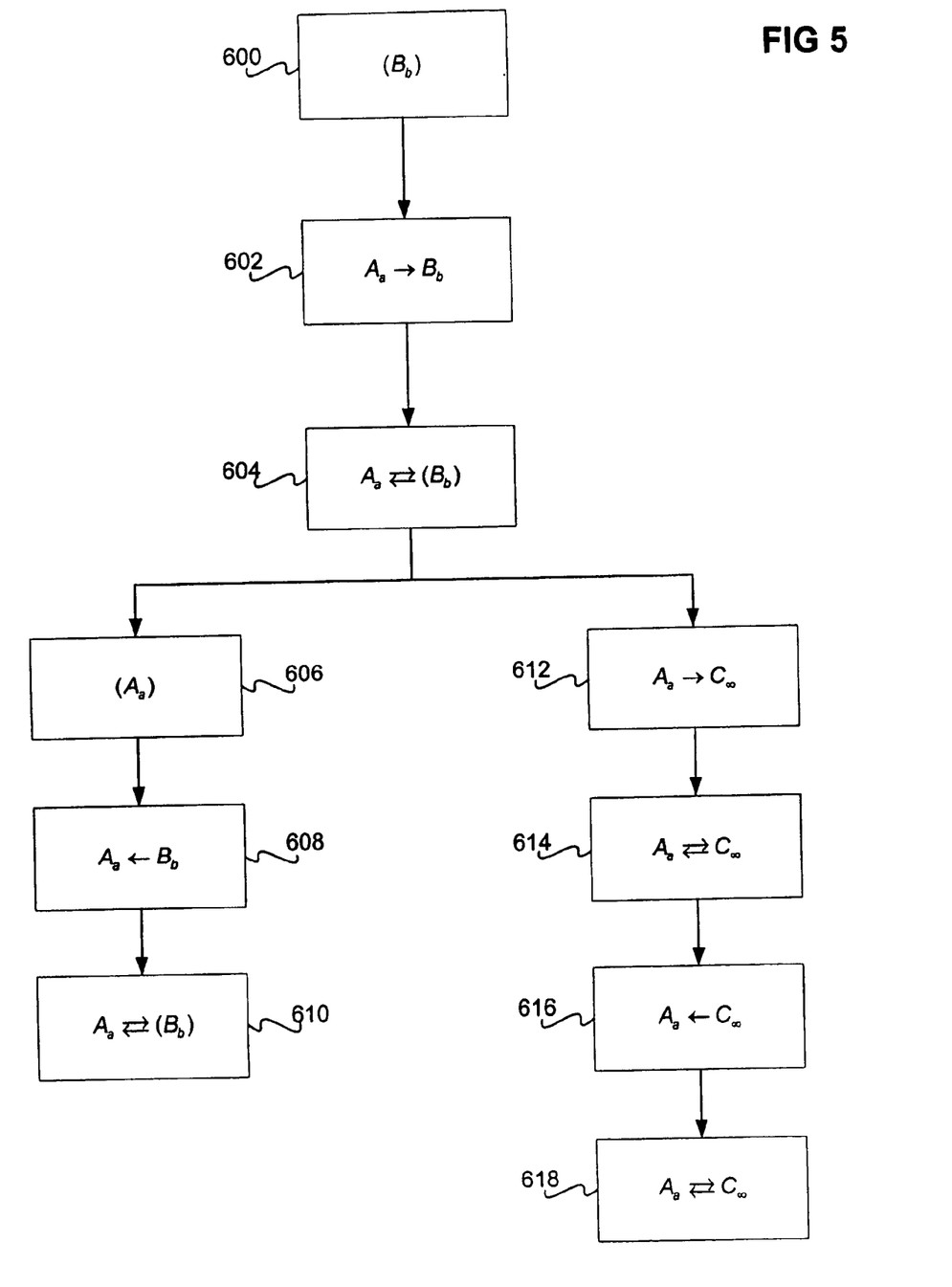

In this section of the detailed description, computer-implemented methods according to varying embodiments of the invention are described, specifically in conjunction with FIG. 5. The computer-implemented methods can be realized at least in part as one or more programs, or parts thereof, running on a computer (such as the computer of FIG. 1)—that is, as a program executed from a machine- or a computer-readable medium such as a memory by a processor of a computer. The programs are desirably storable on a machine-readable medium such as a floppy disk or a CD-ROM, for distribution and installation and execution on another computer.

The following nomenclature is used for the description within this section. A context-bound object A within a context a is written $A_a$. An agile object B is written $B_\infty$ where the symbol $\infty$ specifies that the object exists simultaneously in all contexts and hence is agile. A context-bound object C within a context c and which has reference thereto wrapped within a proxy wrapper is written $(C_c)$.

Referring first to FIG. 5(a), a flowchart of a method according to an embodiment of the invention is shown. In 600, a reference to the context bound object $B_b$ is wrapped within a proxy wrapper, as shown in 600 as $(B_b)$. In 602, the context bound object $A_a$ calls another the context bound object $B_b$. Because their contexts are different, the latter object is referenced by the former object indirectly, through the reference wrapped by the proxy wrapper, as shown in 604. Similarly, in 606, a reference to the object $A_a$ is wrapped, as shown in 606 as (A.). In 608, the object $B_b$ calls the object A. Again, because their contexts are different, the latter object is referenced by the former object indirectly, through the reference wrapped by the proxy wrapper, as shown in 610. Somewhat differently, in 612 the object $A_a$ calls the agile object $C_\infty$. Because the latter object is agile, it can be directly referenced by the object $A_a$, as shown in 614. Similarly, in 616, if the object $C_\infty$ calls the object $A_a$ in the context a, the latter object can be directly referenced by the former object, as shown in 618.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for an object-oriented environment comprising:

wrapping a reference to a second object within a second context with a proxy wrapper, the second context defining at least a second set of arbitrary invariants on a second set of arbitrary objects including the second object;

calling of the second object within the second context by a first object within a first context via the reference as wrapped in the proxy wrapper, the first context defining at least a first set of arbitrary invariants on a first set of arbitrary objects including the first object; and returning of the second object within the second context to the first object within the first context via the reference as wrapped in the proxy wrapper.

2. The method of claim 1, further comprising:

wrapping a reference to the first object within the first context with a proxy wrapper;

calling of the first object by the second object via the reference as wrapped in the proxy wrapper; and, returning of the first object to the second object via the reference as wrapped in the proxy wrapper.

3. The method of claim 1, further comprising:

calling of a third object that is agile by the first object via an unwrapped direct reference, such that the first context of the first object becomes a context for the third object for calling of the third object by the first object, such that the third object executes in the first context of the first object, and such that the agile object is agile in that the agile object has no permanent context; and, responding by the third object to the first object via the unwrapped direct reference.

4. The method of claim 3, further comprising:

calling of the first object by the third object via an unwrapped direct reference; and, responding by the first object to the third object via the unwrapped direct reference.

5. The method of claim 1, further comprising:

calling of a third object within the first context by the first object via an unwrapped dir reference; and, responding by the third object to the first object via the unwrapped direct reference.

6. A computerized system comprising:

a processor; and computer-readable memory storing:

at least one first object within a first context, the first context defining at least a first set of arbitrary invariants on a first set of arbitrary objects including the at lest one first object; and at least one second object within a second context, the second context defining at least a second set of arbitrary invariants on a second set of arbitrary objects including the at least one second object, such that the at least one first object communicates with one another directly via direct references, the at least one second object communicates with one another directly via direct references, and any of the at least one first object communicates with any of the at least one second object via indirect references wrapped in proxy wrappers.

7. The system of claim 6, further comprising at least one agile object, such that the at least one agile object is agile in that the at least one agile object has no permanent context.

8. The system of claim 7, wherein as called by any of the at least one first object any of the at least one agile object executes within the first context, such that any of the at least first object communicates with any of the at least one agile object directly.

9. The system of claim 7, wherein as called by any of the at least one second object any of the at least one agile object executes within the second context, such that any of the at least second object communicates with any of the at least one agile object directly.

10. The system of claim 6, wherein a reference to one of the at least one second object is wrapped in a proxy wrapper, and one of the at least one first object calls the one of the at least one second object via the reference as wrapped in the proxy wrapper.

11. The system of claim 6, wherein a reference to one of the at least one first object is wrapped in a proxy wrapper, and one of the at least one second object calls the one of the at least one first object via the reference as wrapped in the proxy wrapper.

12. A computerized system comprising:
a processor; and
computer-readable memory storing:
- at least one first object within a first context, the first context defining at least a first set of arbitrary invariants on a first set of arbitrary objects including the at least one first object, the at least one first object communicating with one another directly via direct references;
- at least one second object within a second context, defining at least a second set of arbitrary invariants on a second set of arbitrary objects including the at least one second object, the at least one second object communicating with one another directly via direct references, and any of the at least one first object communicating with any of the at least one second object via indirect references wrapped in proxy wrappers; and
- at least one agile object, such that the at least one agile object are agile in that the at least one agile object have no permanent context, such as called by any of the at least one first object any of the at least one agile object executes within the first context, and such that as called by any of the at least one second object any of the at least one agile object executes within the second context.

13. A machine-readable storage medium having a computer program stored thereon for execution by a processor to perform a method comprising:
- wrapping a reference to a second object with a second context with a proxy wrapper, the second context defining at least a second set of arbitrary invariants on a second set of arbitrary invariants on a second set of arbitrary objects including the second object;
- calling of the second object within the second context by a first object within a first context via the reference as wrapped in the proxy wrapper, the first context defining at least a first set of arbitrary invariants on a first set of arbitrary objects including the first object; and
- returning of the second object within the second context to the first object within the first context via the reference as wrapped in the proxy wrapper.

14. The medium of claim 13, further comprising:
- wrapping a reference to the first object within the first context with a proxy wrapper;
- calling of the first object by the second object via the reference as wrapped in the proxy wrapper; and,
- returning of the first object to the second object via the reference as wrapped in the proxy wrapper.

15. The medium of claim 13, further comprising:
- calling of a third object that is agile by the first object via an unwrapped direct reference, such that the first context of the first object becomes a context for the third object for calling of the third object by the first object, such that the third object executes in the first context of the first object, and such that the agile object is agile in that the agile object has no permanent context; and
- responding by the third object to the first object via the unwrapped direct reference.

16. The medium of claim 15, further comprising: calling of the first object by the third object via an unwrapped direct reference; and, responding by the first object to the third object via the unwrapped direct reference.

17. The medium of claim 13, further comprising:
- calling of a third object within the first context by the first object via an unwrapped direct reference; and,
- responding by the object to the first object via the unwrapped direct reference.

* * * * *